United States Patent [19]

Ruble

[11] Patent Number: 4,688,653

[45] Date of Patent: Aug. 25, 1987

[54] METHOD FOR DETERMINING BODY WEIGHT OF A NEWBORN CALF

[75] Inventor: Marshall V. Ruble, Kelley, Iowa

[73] Assignee: Iowa State University Research Foundation, Inc., Ames, Iowa

[21] Appl. No.: 843,028

[22] Filed: Mar. 24, 1986

[51] Int. Cl.$^4$ .................. G01G 23/22; G01B 3/10
[52] U.S. Cl. .................................. 177/1; 177/25; 33/137 R
[58] Field of Search .................. 177/1, 25; 33/137 R

[56] References Cited

FOREIGN PATENT DOCUMENTS

| 0812717 | 4/1959 | United Kingdom | 33/137 |
| 0865986 | 12/1952 | Fed. Rep. of Germany | 33/137 |
| 0079825 | 7/1918 | Switzerland | 33/137 |

*Primary Examiner*—George H. Miller, Jr.
*Attorney, Agent, or Firm*—Zarley, McKee, Thomte, Voorhees & Sease

[57] ABSTRACT

The method of determining the body weight of a newborn calf comprises weighing a control group of first newborn calves having different body weights, measuring the circumference of a front hoof of each of the first newborn calves in the control group, and recording the respective body weights and hoof circumferences measured for each of the calves in the control group. Next, the circumference of a front hoof of a newborn calf of unknown body weight is measured and is compared to a substantially equal hoof circumference of one of the newborn calves in the control group. The weight of the newborn calf of unknown body weight is determined by equating it to the body weight of the newborn calf in the control group having the closest hoof circumference to the hoof circumference measured for the calf of unknown body weight.

11 Claims, 3 Drawing Figures

U.S. Patent  Aug. 25, 1987  4,688,653
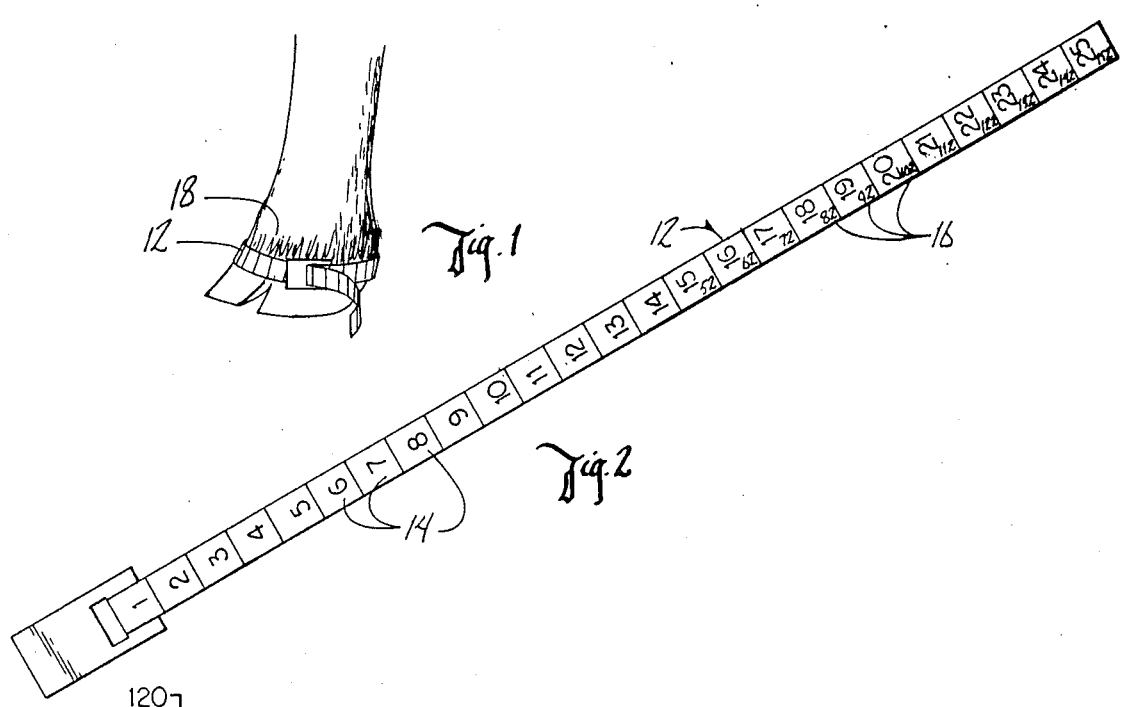
Fig. 1
Fig. 2
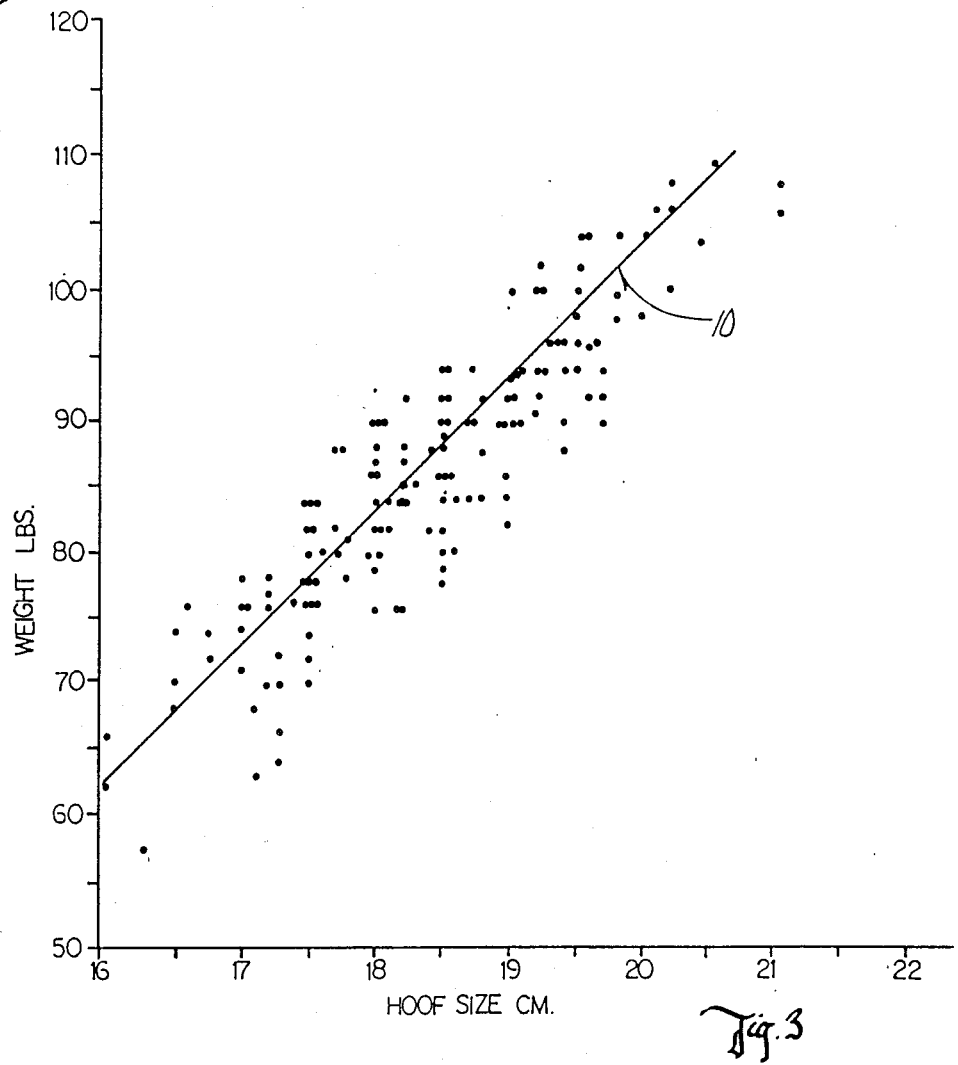
Fig. 3

METHOD FOR DETERMINING BODY WEIGHT OF A NEWBORN CALF

BACKGROUND OF THE INVENTION

The present invention relates to a method for determining the body weight of a newborn calf.

In the raising of calves, it is particularly important to keep accurate statistics of the calf's weight throughout its lifetime. This is particularly true when calves are raised as breeding stock, inasmuch as the statistics relating to the weight of the calf during different stages of its life can be used to help predict the weight gain characteristics of its progeny.

In order to determine the amount of weight gain of each calf, it is necessary to take an initial measurement as soon as possible after the calf has been born. Measuring the weight of the calf, however, is a time consuming and cumbersome effort. It is also sometimes dangerous because the mother of the calf often is very protective of her new calf and may attack the person attempting to weigh the calf.

Another problem involved in weighing the newborn calves is that there are often a number of the calves born at the same time. It is therefore desirable to be able to determine the calf's weight quickly and easily so that the statistics for a large number of calves can be gathered in a short period of time.

It is also desirable to determine the weight of the newborn calves in the field or pasture where they are born. With prior known methods, it was therefore necessary to transport scales to the field or pasture in order to weigh the calves.

Therefore, a primary object of the present invention is the provision of an improved method for determining the body weight of a newborn calf.

A further object of the present invention is the provision of a method for determining the body weight of a newborn calf which is quick and can be done easily in the field where the calf may be located.

A further object of the present invention is the provision of a method for determining the body weight of a newborn calf which comprises merely measuring the circumference of the hoof of the calf.

A further object of the present invention is the provision of a method for determining the body weight of a newborn calf which provides a substantially accurate approximation of the calf's weight as compared to the weights of a control group of calves.

A further object of the present invention is the provision of a method for determining the body weight of a newborn calf which is simple, quick and efficient.

SUMMARY OF THE INVENTION

The present invention involves determining the body weight of a newborn calf by measuring the circumference of the calf's front foot around the coronary band. It has been determined that there is a close correlation between the hoof size of the calf, and its weight. As the calf increases in weight, the calf's hoof circumference also increases.

The present invention involves measuring the weight and hoof circumference of a control group of first born calves. The control group should be chosen so as to have the same general characteristics as the calves to be measured. For example, the control group should be the same breed, and should be measured at approximately the same age as the calves which will ultimately be measured by the present method.

After the weight and hoof circumferences of the control group of calves have been measured, the measurements are recorded. One method of recording these measurements is to place them on a cartesian graph with one axis of the graph representing hoof size, and with the other axis of the graph representing weight. Each point on the graph represents the weight and hoof size of one calf from the control group. The weights of the various calves for any given hoof size generally are very close to one another, and from this data on the graph it can be determined that there is a linear relationship between the increase in hoof size and the increase in weight. This linear representation can be ascertained by drawing a straight line which approximately interconnects the various points shown on the graph for the various hoof sizes and weights.

After the data from the control group have been recorded, it is possible to ascertain the approximate weight of a newborn calf of unknown weight by measuring the circumference of its hoof. Once this hoof size has been determined, it is possible to compare the hoof size to the data shown on the graph and by so doing to determine the weight of the calf which corresponds to the weight of the calves in the control group having similar hoof sizes. It has been determined that by comparing the circumference of the hoof to the chart, one can predict the weight of the newborn calf to within approximately two pounds, and that within this range, there is a positive correlation between the weight determined by the present method and the actual weight of the calf of approximately 0.84.

It is also possible by the present method to mark the weights of the control group on the tape measure itself adjacent the appropriate indicia relating to hoof circumference. Thus, by using the tape measure, it is possible to ascertain the hoof circumference and at the same time to read the calf weight off of the tape itself.

The present invention eliminate the necessity of carrying the scales to the field during calving, and it also provides a safer method for measuring the calf's weight inasmuch as it does not require removing the calf from its mother.

BRIEF DESCRIPTION OF THE FIGURES OF THE DRAWINGS

FIG. 1 is a perspective view of a calf's front hoof showing the tape measure positioned therearound.

FIG. 2 is a top plan view of a tape measure having the appropriate indicia for hoof circumference and for body weight marked thereon.

FIG. 3 is a graphic representation of the data taken from a control group of calves.

DETAILED DESCRIPTION OF THE PREFERRED EMBODIMENT

The present invention stems from the discovery that there is a correlation between the front hoof circumference of a calf and the calf's weight. The first step in the present method involves measuring the circumference of the front hoof of a group of calves in a control group, and also measuring the body weights for each of the calves in that control group. The graph in FIG. 3 shows a series of points which represent the weights and hoof sizes of calves measured in the control group. The weight measurements are taken by conventional means utilizing scales to weigh the calves.

As can be seen in FIG. 3 of the drawings, the locations of the various weights follow a pattern which can generally be described by the line designated by the numeral 10.

In order to determine the weight of a newborn calf utilizing the present data, it is merely necessary to measure the hoof circumference of the calf of unknown weight. The circumference measured on the calf's hoof is compared against the graph shown in FIG. 3. For example, if the circumference of the calf's hoof is 17 centimeters, then the chart indicates that the calf will have an approximate weight of 72 pounds. This is determined by locating the point on line 10 which has as its horizontal coordinate, the designation for 17 centimeters. The vertical component corresponding to this point on line 10 is 72 pounds. It has been found that by utilizing this method, it is possible to predict the weight of the calf to within about two pounds, with a correlation of predicted weight to actual weight of approximately 0.84.

This method provides a simpler way for determining the approximate weight of a calf than presently known methods. It eliminates the need for carrying scales to the field during calving. It also reduces the danger to the operator resulting from the calves' mothers protective instincts. Since the calf can be measured quickly, there is less interference between the mother and the calf, and the mother is not as likely to attack the measurer.

While the data from the control group is shown in FIG. 3 to be displayed on a cartesian graph, this data can be displayed in other means such as tables or charts, and can be used equally as effectively as in the manner shown in FIG. 3.

One way of simplifying the use of the data is to place the data directly upon the measuring tape as is shown in FIG. 2. FIG. 2 shows a measuring tape 12 having a plurality of indicia 14 which refer to the circumference of the calves' hoof in centimeters. A second set of indicia 16 are placed on the tape, and include indicia relating to the average weights of the calves found in the control group for each of the various hoof circumferences measured. For example, the calves in the control group which showed a hoof circumference of 15 centimeters showed an average weight of 52 pounds; with a hoof circumference of 16 centimeters, they showed an average weight of 62 pounds; and so on.

With the tape of FIG. 2, it is possible to ascertain the weight and the hoof circumference simultaneously by placing the tape 12 around the calf's hoof 18 at the coronary band, as shown in FIG. 1. The circumference of the calf's hoof is read off of the tape, and the average weight for a calf having that circumference is also read off of the tape at the same location. This eliminates the requirement for referring to a separate table or separate chart such as shown in FIG. 3.

Thus, it can be seen that the device accomplishes at least all of its stated objectives.

What is claimed is:

1. The method of determining the body weight of calves, comprising:
    weighing a control group of first newborn calves having different body weights;
    measuring the circumference of a front hoof of each of said first newborn calves in said control group;
    recording the respective body weights and hoof circumferences for each of said first newborn calves in said control group;
    measuring the circumference of a front hoof of a calf of unknown body weight;
    comparing the hoof circumference of said calf of unknown body weight with a substantially equally hoof circumference of one of said first newborn calves, in said control group;
    equating the body weight of said one of said first newborn calves in said control group to said calf of unknown body weight.

2. A method according to claim 1 further comprising recording the body weights and hoof circumferences of said calves of said control group as points on a cartesian graph having a first axis representing weight, and a second axis representing hoof circumference, each of said points being located at the coordinates on said graph corresponding to the respective body weights and hoof circumferences of said calves of said control group, locating a line on said graph which approximately interconnects said points to represent the value of recorded weight for each recorded hoof size as shown by said points on said graph.

3. A method according to claim 2 wherein said comparing is accomplished by comparing the hoof circumference of said newborn calf of unknown body weight with said line on said groph to locate the coordinate for body weight on said line corresponding to the coordinate on said line for said hoof circumference measured on said newborn calf of unknown body weight.

4. A method according to claim 1 wherein said recording of said body weights and hoof circumferences of said calves of said control group comprises placing a plurality of weight indicia corresponding to said measured weights of said calves of said control group on a flexible tape measure having a plurality of calibrations thereon corresponding to the various hoof circumferences measured from said calves of said control group, and locating said weight indicia for each one of said calves of said control group adjacent one of said calibrations corresponding to the hoof circumference measured for said one calf of said control group.

5. A method according to claim 4 comprising using said tape to measure the hoof circumference of said calf of unknown weight and recording the one of said weight indicia located on said tape adjacent the one of said calibrations on said tape corresponding to said measured hoof circumference of said calf of unknown body weight.

6. A method according to claim 5 wherein the weights of said control group are placed on one side of said tape and said calibrations for measuring hoof circumference calibrations are placed on the other side of said tape.

7. A method according to claim 5 wherein the weights of said control group and said calibrations for measuring hoof circumference are placed on the same side of said tape.

8. A method according to claim 1 wherein the measurement of said front hoof of each of said claves is accomplished by placing the measuring tape adjacent the coronary bands of said calves.

9. A method according to claim 1 further comprising recording the body weights and hoof circumferences of said calves of said control group as points on a table.

10. A method according to claim 1 further comprising recording the body weights and hoof circumferences of said calves of said control group as points on a chart.

11. A method according to claim 1 wherein said calves in said control group are the same breed and age of said calves of unknown body weight.

* * * * *